(12) United States Patent
Lu et al.

(10) Patent No.: US 6,799,092 B2
(45) Date of Patent: Sep. 28, 2004

(54) ROLLOVER STABILITY CONTROL FOR AN AUTOMOTIVE VEHICLE USING REAR WHEEL STEERING AND BRAKE CONTROL

(75) Inventors: Jianbo Lu, Livonia, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 09/789,656

(22) Filed: Feb. 21, 2001

(65) Prior Publication Data

US 2002/0139599 A1 Oct. 3, 2002

(51) Int. Cl.$^7$ .................................................. B60T 8/60
(52) U.S. Cl. .............................. 701/1; 701/38; 303/189
(58) Field of Search ................................ 701/1, 72, 78, 701/83, 38; 180/197, 282; 303/146, 166, 189

(56) References Cited

U.S. PATENT DOCUMENTS

| | | |
|---|---|---|
| 2,917,126 A | 12/1959 | Phillips |
| 3,608,925 A | 9/1971 | Murphy |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,809,183 A | 2/1989 | Eckert |
| 4,898,431 A | 2/1990 | Karnopp et al. |
| 4,964,679 A | 10/1990 | Rath |
| 4,976,330 A | 12/1990 | Matsumoto |
| 4,998,593 A | 3/1991 | Karnoop et al. |

(List continued on next page.)

FOREIGN PATENT DOCUMENTS

| | | |
|---|---|---|
| DE | 36 16 907 | 11/1987 |
| DE | 38 15 938 | 11/1989 |
| DE | 43 21 571 | 1/1994 |
| DE | 42 27 886 | 2/1994 |
| DE | 42 28 893 | 3/1994 |
| DE | 43 35 979 | 4/1995 |
| DE | 196 02 879 | 8/1997 |
| DE | 197 51 867 | 5/1999 |
| DE | 197 51 891 | 5/1999 |
| DE | 197 51 925 | 5/1999 |

(List continued on next page.)

OTHER PUBLICATIONS

A Method For Reducing On–Road Rollovers—Anti–Rollover Braking, Thomas J. Wielenga, Dynamotive, L.L.C., International Congress and Exposition, Detroit, Michigan, Mar. 1–4, 1999.

*Primary Examiner*—Richard M. Camby
(74) *Attorney, Agent, or Firm*—Gregory P. Brown (57) ABSTRACT

A stability control system (24) for an automotive vehicle includes a rollover sensor that may include one or more sensor to a various dynamic conditions of the vehicle and a controller to control a steering force to reduce a tire moment so the net moment of the vehicle is counter to the roll direction. The sensors may include a speed sensor (30), a lateral acceleration sensor (32), a roll rate sensor (34), a yaw rate sensor (20) and a longitudinal acceleration sensor (36). The controller (26) is coupled to the speed sensor (30), the lateral acceleration sensor (32), the roll rate sensor (34), front steering angle sensor (35), pitch rate (38), rear steering position sensor (40), and a longitudinal acceleration sensor (36). The controller (26) determines a roll angle estimate in response at least one or more of the signals. The controller (26) changes a tire force vector using by changing the direction and or force of the rear steering actuator and brakes in response to the likelihood of rollover.

18 Claims, 6 Drawing Sheets

U.S. PATENT DOCUMENTS

| | | | |
|---|---|---|---|
| 5,089,967 | A | 2/1992 | Haseda et al. |
| 5,224,765 | A | 7/1993 | Matsuda |
| 5,335,176 | A | 8/1994 | Nakamura |
| 5,408,411 | A | 4/1995 | Nakamura et al. |
| 5,446,658 | A | 8/1995 | Pastor et al. |
| 5,610,575 | A | 3/1997 | Gioutsos |
| 5,634,698 | A | 6/1997 | Cao et al. |
| 5,640,324 | A | 6/1997 | Inagaki |
| 5,671,982 | A | 9/1997 | Wanke |
| 5,707,117 | A | 1/1998 | Hu et al. |
| 5,707,120 | A | 1/1998 | Monzaki et al. |
| 5,732,378 | A | 3/1998 | Eckert et al. |
| 5,732,379 | A | 3/1998 | Eckert et al. |
| 5,737,224 | A | 4/1998 | Jeenicke et al. |
| 5,742,918 | A | 4/1998 | Ashrafi et al. |
| 5,762,406 | A | 6/1998 | Yasui et al. |
| 5,782,543 | A | 7/1998 | Monzaki et al. |
| 5,809,434 | A | 9/1998 | Ashrafi et al. |
| 5,825,284 | A | 10/1998 | Dunwoody et al. |
| 5,857,535 | A | 1/1999 | Brooks |
| 5,869,943 | A | 2/1999 | Nakashima et al. |
| 5,890,084 | A | 3/1999 | Halasz et al. |
| 5,893,896 | A | 4/1999 | Imamura et al. |
| 5,931,546 | A | 8/1999 | Nakashima et al. |
| 6,002,974 | A | 12/1999 | Schiffman |
| 6,002,975 | A | 12/1999 | Schiffman et al. |
| 6,038,495 | A | 3/2000 | Schiffman |
| 6,065,558 | A | 5/2000 | Wielenga |
| 6,263,261 | B1 * | 7/2001 | Brown et al. .................. 701/1 |

FOREIGN PATENT DOCUMENTS

| | | |
|---|---|---|
| DE | 197 51 935 | 5/1999 |
| DE | 198 02 041 | 7/1999 |
| DE | 199 07 633 | 10/1999 |
| DE | 197 51 839 | 5/2000 |
| EP | 0758601 | 2/1997 |
| FR | 24 35 342 | 12/1979 |
| GB | 2257403 | 1/1993 |
| GB | 2316455 | 2/1998 |
| JP | 57-6064 | 7/1983 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6312612 | 11/1994 |
| JP | 8080825 | 3/1996 |
| JP | 9005352 | 1/1997 |
| JP | 10024819 | 1/1998 |
| JP | 10278762 | 10/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| SU | 816849 | 3/1981 |
| WO | WO 99/30942 | 6/1999 |

\* cited by examiner

ROLLOVER STABILITY CONTROL FOR AN AUTOMOTIVE VEHICLE USING REAR WHEEL STEERING AND BRAKE CONTROL

TECHNICAL FIELD

The present invention relates generally to a dynamic behavior control apparatus for an automotive vehicle, and more specifically, to a method and apparatus for controlling the roll characteristics of the vehicle by controlling the rear steering direction and brakes of the vehicle.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the roll over characteristic of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the vehicle body on a plane or nearly on a plane parallel to the road surface. Roll over control is maintaining the vehicle wheels on the road surface. One system of tilt control is described in U.S. Pat. No. 5,869,943. The '943 patent uses the combination of yaw control and tilt control to maintain the vehicle body horizontal while turning. The system is used in conjunction with the front outside wheels only. To control tilt, a brake force is applied to the front outside wheels of a turn.

One known yaw control system described in U.S. Pat. No. 5,634,698 uses rear wheel steering to help achieve yaw stability using brake control. However, this system does not provide or teach the use of such a control for preventing rollover of the vehicle.

Another known system for preventing rollover is found in U.S. Pat. No. 6,065,558, which applies brakes to the outside front wheels to prevent rollover. In certain maneuvers, however, application of front brakes alone may not be desirable due to the particular handling characteristics of the vehicle.

It would therefore be desirable to provide a roll stability system that detects a potential rollover condition and temporarily applies steering and braking in a desired direction to counter rollover.

SUMMARY OF THE INVENTION

It is therefore an object of the invention to provide a roll control system for use in a vehicle using steering direction of the rear wheels together with application of brakes.

In one aspect of the invention, stability control system for an automotive vehicle includes a plurality of sensors sensing the dynamic conditions of the vehicle and a controller that controls a rear steering direction and brake force to reduce a tire moment so the net moment of the vehicle is counter to the roll direction. The sensors may include a speed sensor, a lateral acceleration sensor, a longitudinal acceleration sensor, a roll rate sensor, and a yaw rate sensor. A controller is coupled to the sensors to determine a roll angle estimate. The controller determines the direction and steering effort change in response to the relative roll angle estimate to counter roll.

In a further aspect of the invention, a method of controlling roll stability of the vehicle comprises the steps of:
determining a roll angle estimate in response to a rollover sensor; and
controlling a rear steering actuator and a brake controller to a predetermined tire force vector in response to the relative roll angle estimate.

One advantage of the invention is that such systems may be easily implemented into a steer-by-wire system.

Other objects and features of the present invention will become apparent when viewed in light of the detailed description of the preferred embodiment when taken in conjunction with the attached drawings and appended claims.

DESCRIPTION OF THE PREFERRED EMBODIMENTS

Figure 1:
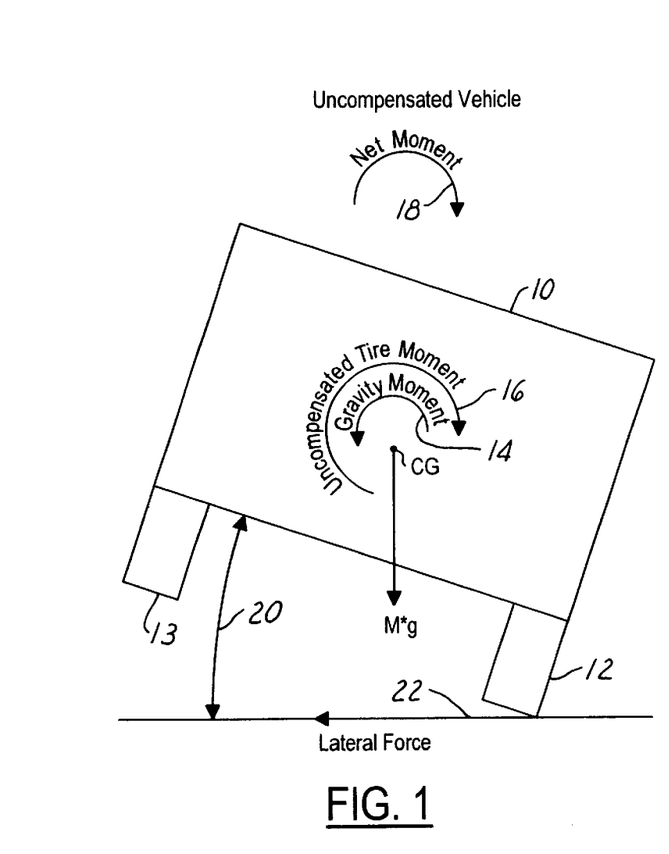
FIG. 1 is a diagrammatic rear view of a vehicle with force vectors not having a roll stability system according to the present invention.

Referring to FIG. 1, an automotive vehicle 10 without a rollover stability system of the present invention is illustrated with the various forces and moments thereon during a rollover condition. Vehicle 10 has right and left tires 12 and 13 respectively. The vehicle may also have a number of different types of steering configurations including having each of the front and rear wheels configured with an independently controllable actuator, the front and rear wheels having a conventional type system in which both of the front wheels are controlled together and both of the rear wheels are controlled together, a system having conventional front steering and independently controllable rear steering for each of the wheels or vice versa. A variation of a control system for each will be described below. Generally, the vehicle has a weight represented as M*g at the center of gravity of the vehicle. A gravity moment 14 acts about the center of gravity (CG) in a counter-clockwise direction. A tire moment 16 acts in a clockwise direction about the center of gravity. Thus, the net moment 18 acting upon the vehicle is in a clockwise direction and thus increases the roll angle 20 of the vehicle. The lateral force 22 at the tire 12 on the ground (tire vector) is a significant force to the left of the diagram capable of overturning the vehicle is uncorrected.

Figure 2:
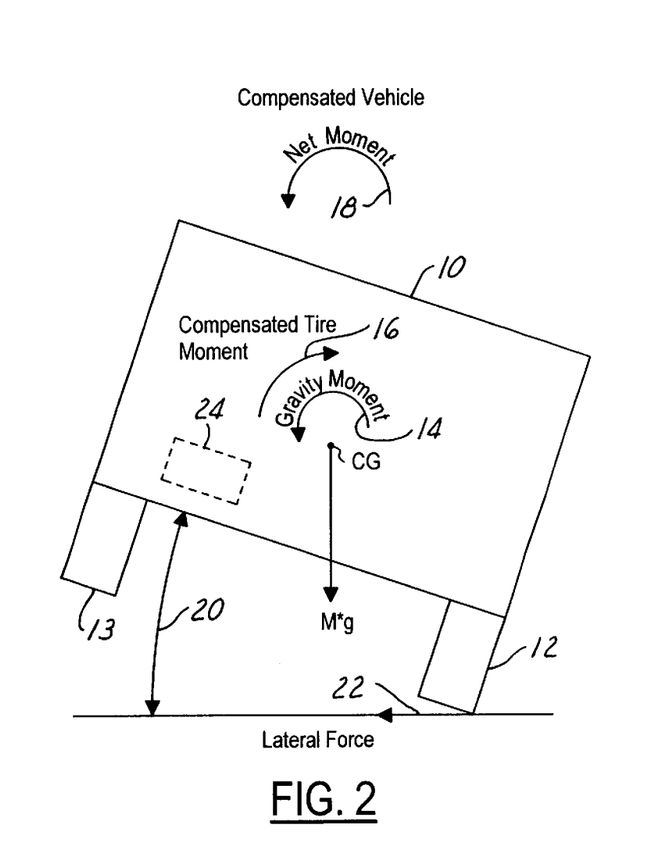
FIG. 2 is a diagrammatic rear view of a vehicle with force vectors having a roll stability system according to the present invention.

Referring now to FIG. 2, a roll stability control system 24 is included within vehicle 10, which is in a roll condition. The forces illustrated in FIG. 2 are given the same reference numerals as the forces and moments in FIG. 1. In FIG. 2, however, roll stability control system 24 reduces the tire moment 16 to provide a net moment 18 in a counter-clockwise direction. Thus, the tire vector or lateral force 22 at tire 12 is reduced as well. This tendency allows the vehicle to tend toward the horizontal and thus reduce angle 20.

Figure 3:
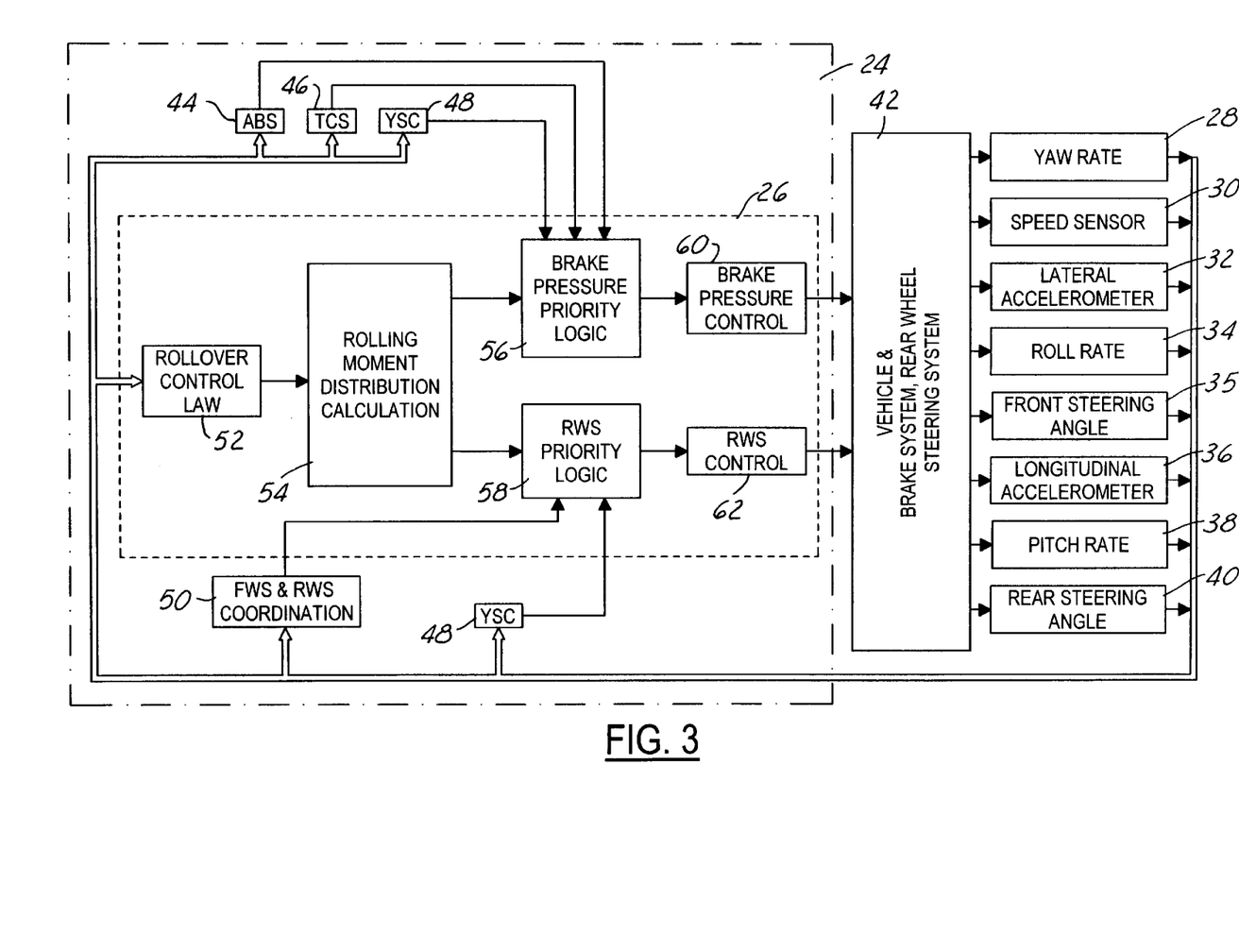
FIG. 3 is a block diagram of a roll stability system according to the present invention.

Referring now to FIG. 3, roll stability control system 24 has a controller 26 used for receiving information from a number of sensors which may include a yaw rate sensor 28, a speed sensor 30, a lateral acceleration sensor 32, a roll rate sensor 34, a steering angle sensor 35, a longitudinal acceleration sensor 36, a pitch rate sensor 38, a rear steering position sensor 40. As illustrated, sensors 28–40 are coupled to brake and steering system 42. Sensors 28–40 may be a part of these systems and therefor are illustrated coupled to box 42. As will be described below certain of these sensors may also be used by or incorporated into other vehicle systems including an antilock brake system having an ABS controller 44, a traction control system having a TCS controller 46 and an yaw stability control (YSC) system having a YSC controller 48.

Based upon inputs from the sensors, controller 26 controls a tire force vector by rear steering and brake control as will be further described below. Rollover sensor is used to describe one or more of the sensors 28–40 used to determine the likelihood of a rollover condition or roll angle for the vehicle. Depending on the desired sensitivity of the system and various other factors, not all the sensors 28–40 may be used in a commercial embodiment. Various types of sensors may be used to provide the desired signals.

Lateral acceleration, roll orientation and speed may be obtained using a global positioning system (GPS).

There are many possible ways to measure, estimate or infer the roll and pitch condition of the vehicle. The roll rate sensor 34 and pitch rate sensor 38 may be replaced with a number of other vehicle measurements or combinations of measurements.

Roll rate sensor 34 and pitch rate sensor 38 may determine the roll condition of the vehicle based, in part, on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 38 may also sense the roll condition based on sensing the linear or rotational relative displacement or displacement velocity of one or more of the suspension chassis components which may include a linear height or travel sensor or a rotary height or travel sensor.

Roll rate sensor 34 and pitch rate sensor 38 may also sense the roll condition based on the preceding position measurements or other inertial measurements combined with wheel speed sensors used to look for abnormal changes in one or more wheel velocities that may indicate a zero normal load on the tires.

Roll rate sensor 34 and pitch rate sensor 38 may also sense the roll condition based on one of the preceding position measurements or other inertial measurements combined with a driver heading command input from an electronic component that may include steer by wire using a hand wheel or joy stick.

The potential of a roll condition is associated with a zero normal load or a wheel lift condition on one or more of the wheels. A zero normal load, and thus a roll condition may be determined by sensing the force or torque associated with the loading condition of one or more suspension or chassis components including a pressure transducer in a suspension actuator. Similarly, a load cell or a strain gauge may be mounted to measure the force in a suspension component. The zero normal load condition may be used alone or in combination with other displacement or inertial measurements to accurately monitor the vehicle roll condition.

The power steering system actuation can be monitored to infer the normal load on the steered wheels. The steering load can be monitored by measuring one or more of the absolute or relative motor load, the steering system pressure of the hydraulic lines, tire lateral force sensor or sensors, a longitudinal tire force sensor(s), vertical tire force sensor(s) or tire sidewall torsion sensor(s). The steering system measurements used depend on the steering system technology and the sensors available on the vehicle.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed or proximity sensor, a sonar-based speed or proximity sensor, a laser-based speed or proximity sensor or an optical-based speed or proximity sensor.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity (V_CG). Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Figure 4:
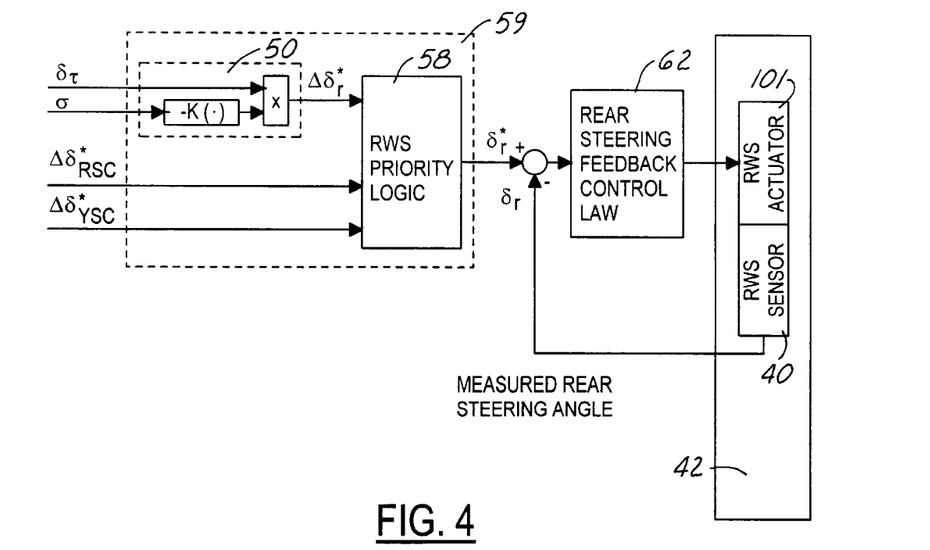
FIG. 4 is a block diagram for the closed loop rear steering control system according to the present invention.

The added components of the present system work together with those normally found in automotive vehicles. For example, a front wheel steering (FWS) and rear wheel steering (RWS) control coordinator may be coupled to rollover controller 50. Steering control coordinator 50 is used to guarantee proper steering of the vehicle from usual to critical conditions. Coordinator 50 gives the driver advanced steering feeling. Proper coordination between the front and rear steering reduces the turning radius of a vehicle, especially in low vehicle speed. Let $\delta_f$ be the measured front steering angle, $Dd_{RIF}{}^*$ be the desired rear steering angle to achieve coordination, then the following coordination scheme can be implemented:

$$\Delta\delta_{RIF}{}^* = -K(v)*\delta_f$$

where K(v) is a gain factor which is a function of the vehicle velocity v. This desired rear steering angle, together with other portion of the desired rear steering angles, becomes the foundation for the total target rear steering angle $\delta_r^*$. $\delta_r^*$ is sent to the rear steering control unit which generated the feedback control command to drive the rear steering actuator. The coordination control unit 50 may control the position of a rear left wheel actuator, and a right rear wheel actuator. Although as described above, two of the actuators may be simultaneously controlled. For example, in a rack-and-pinion system, the two wheels coupled thereto are simultaneously controlled. The closed loop rear steering control system is depicted in FIG. 4, which includes the total desired rear steering angle generating unit 59, the rear steering feedback control law 62, the rear steering actuator 101 and the rear steering angle sensor 40. Where 101 and 40 are part of the vehicle 42. The total desired rear steering angle $\delta_r^*$, calculated by feeding into the unit 59 the desired rear steering angle $\Delta\delta_{RSC}^*$ for achieving roll stability control, $\Delta\delta_{YIF}^*$ for achieving yaw stability control and $\Delta\delta_{RIF}^*$ for achieving coordination between front steering and rear steering. This total $\delta_r^*$, together with the measured rear steering angle $\delta_r$ is then fed back to the rear steering feedback control law unit 60. This feedback control unit calculates the control command to drive the RWS actuator. If we define the error between the desired $\delta_r^*$ and the actual $\delta_r$ as $e_s$, i.e., $e_s = \delta_r - \delta_r^*$, then the rear steering control command can be calculated as in a PID controller:

$$K_{SP}e_s(t) + K_{SI}\int_0^t e_s(\tau)d\tau + K_{SD}\dot{e}_s(t)$$

where $K_{SP}, K_{SI}$ and $K_{SD}$ are the control gains. In digital implementation, this PID control law can be easily discretized based on the sampling rate.

Controller 26 has a rollover control law block 52, which represents the determination of a roll condition or likelihood of rollover. This may be done by calculating a roll angle of the vehicle. Based on the inputs from certain of the sensors 28 through 40 (referred to as a rollover sensor), controller 26 determines the presence or likelihood of a roll condition.

When the presence or a likelihood of rollover is determined in block 52, the rolling moment distribution is determined in block 54. The operation of block 52 will be further described below. To summarize, block 52 compares the moment to prevent rollover with the moments being provided at the brake system and the rear steering wheel system and determining a brake pressure signal and a rear wheel steering signal in response to the distribution.

Controller 26 also includes brake pressure priority logic 56 and rear wheel steering priority logic 58. Brake pressure priority logic 56 receives a brake pressure signal from rolling moment distribution calculator 54. Rear wheel steering priority logic 58 receives a rear wheel steering signal from rolling moment distribution calculator 54.

Brake pressure priority logic 56 is also coupled to anti-lock brake controller 44, traction control system controller 46, and YSC controller 48. Each of the systems including rollover control systems may operate the brakes of the vehicle. Brake pressure priority logic 56 determines an amount of braking for the individual wheels in accordance with a hierarchical ranking system. The ranking system is preferably experimentally determined and based on the overall dynamics of the vehicle. Therefore, from one vehicle type to the next, this priority scheme may be changed. Brake pressure priority logic 56 may also act to maximize the amount of desired control from various systems.

Rear wheel steering priority logic 58 is coupled to front wheel steering and rear wheel steering coordinator 50 and YSC controller 48. Both of these systems control the operation of the steering system of the vehicle and more specifically the rear steering system of the vehicle. The rear wheel system or steering priority logic 58 is controlled and in a hierarchical fashion in a similar manner to that of brake pressure priority logic 56. That is, the rear wheel steering priority logic 58 may be experimentally determined to provide the desired amount of control for the various systems coupled thereto including rollover control system 24.

Brake pressure priority logic 56 and rear wheel steering priority logic 58 are coupled to brake and steering system 42 through a respective brake pressure controller 60 and a rear wheel steering controller 62. The brake pressure controller 60 and rear wheel system controller 62 generate a respective rear wheel actuator signal and brake actuator signal which are used to trigger the desired amount of braking and rear wheel steering control. The brake actuator control signal may provide a signal for the brakes of each of the four corners of the vehicle.

Figure 5:
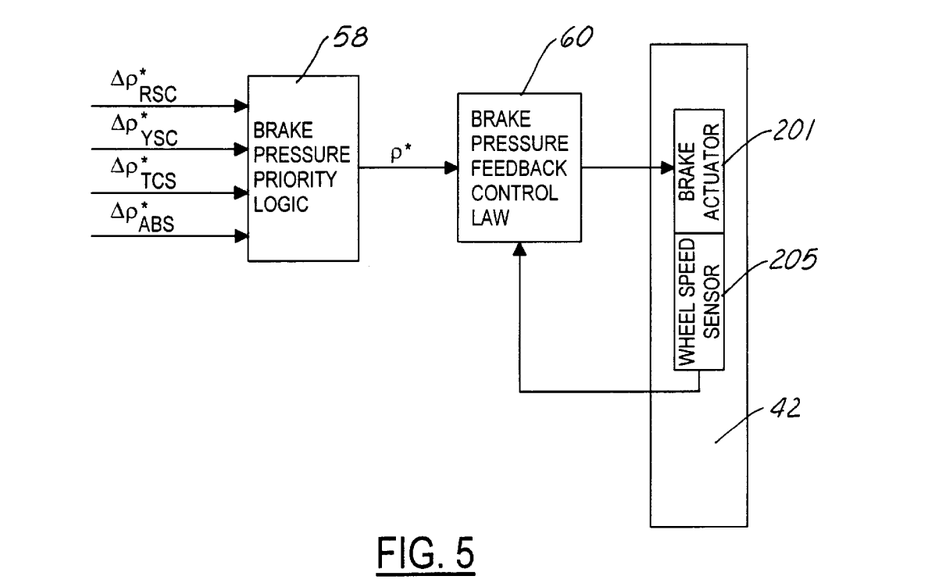
FIG. 5 is a block diagram for the closed loop brake pressure control system without brake pressure sensor according to the present invention.
Figure 6:
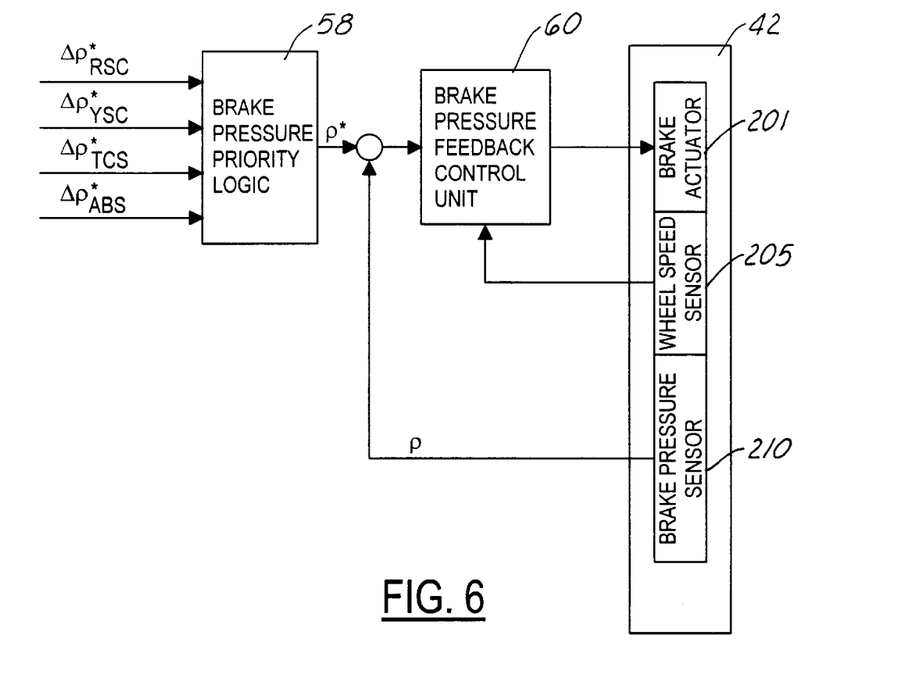
FIG. 6 is a block diagram for the closed loop brake pressure control system with brake pressure sensor according to the present invention.

FIG. 5 shows the closed loop brake control system, which includes the total desired brake pressure generating mechanism (unit 58), the brake pressure feedback control law 60, the brake actuator 201 and the wheel speed sensor 205. Where 201 and 205 are part of the vehicle 42. The desired pressure amount $\Delta p_{RSC}^*$ for rollover stability control, the desired pressure amount $\Delta p_{YSC}^*$ for yaw stability control, the desired pressure amount $\Delta p_{TCS}^*$ for traction control and the desired pressure amount $\Delta p_{ABS}^*$ for anti-lock braking are fed into the brake pressure priority block 58, and a final desired brake pressure p* is calculated. This desired brake pressure is then further fed into a brake pressure feedback controller, together with the measured wheel speed sensor signals, to generate feedback control signals for the brake actuators. If the brake pressure sensors are available, the brake closed loop system shown in FIG. 5 can be modified to the system shown in FIG. 6. This system includes unit 58, unit 60, the brake actuator 201, the wheel speed sensor 205 and the brake pressure sensor 210 201, 205 and 210 are part of the vehicle 42. The feedback control law 60 command the hardware to achieving pressure command following. If we define the pressure error as $e_p = p - p^*$, a PID control scheme can be applied to 60:

$$K_{BP}e_p(t) + K_{BI}\int_0^t e_p(\tau)d\tau + K_{BD}\dot{e}_p(t)$$

where $K_{BP}, K_{BI}$ and $K_{BD}$ are the control gains.

Figure 7:
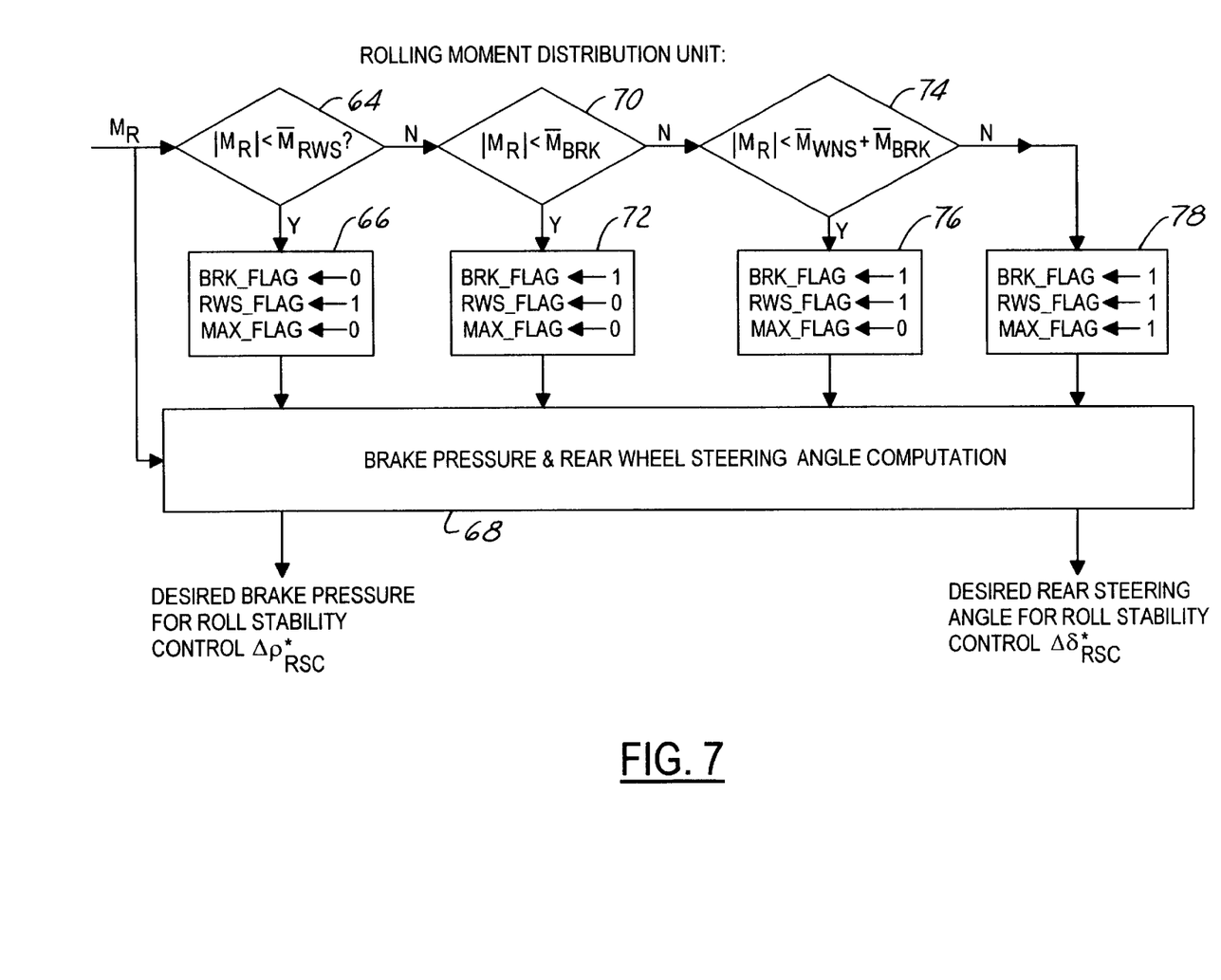
FIG. 7 is a flow chart of a roll moment distribution determination according to the present invention.

Referring now to FIG. 7, the following terms are used in the following flow chart:

$M_R$: Rolling moment desired for controlling rollover $\overline{M}_{RWS}$: The maximum roll moment generated through rear wheel steering at current driving condition $\overline{M}_{BRK}$: The maximum roll moment generated through break control at current driving condition $C_1$: The gain factor, which relates the brake pressure and the rolling moment generated from this brake pressure $C_1$: changes during driving. $C_1$ may depend on:

the axle normal force N the surface friction coefficient $\mu_{surface}$ the front and rear steering angle $\delta_f$ and $\delta_r$ the total brake piston area $A_{piston}$ the friction coefficient between the disk and the brake lining $\mu_{disk-lining}$ the rolling radius r the average distance from the brake pad to the wheel rotation center $r_0$ the height of center of gravity of the vehicle $h_{cg}$ A mathematical formula for $C_1$ may also be determined. For example $C_1$ can be expressed as:

$$C_1 = \frac{2h_{cg}C_p}{\sqrt{(N\mu_{surface})^2 - (C_p p_0)^2}}$$

where $C_p$ is the coefficient used to relate the lateral tire forces to the brake pressure, which is a function of the above listed variables, $p_0$ is the nominal brake pressure or the pressure at the time the rollover brake control is requested, which can be estimated from a brake system model or measured through a pressure sensor.

$C_2$: The Gain Factor Which Relates the Steering Angle and Rolling Moment Generated From This Steering Angle.

Figure 9:
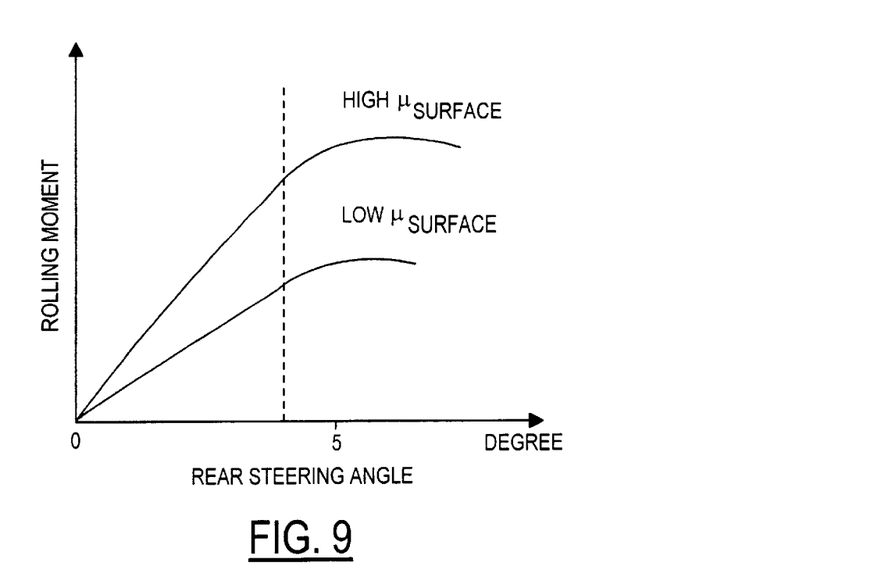
FIG. 9 is a plot shows the relationship between the rear steering generated rolling moment and the rear steering angle according to the present invention.

$C_2$ changes during driving. $C_2$ may depend on yaw rate vehicle velocity vehicle side slip angle c.g. height surface coefficient:

Since the active rear steering actuation usually achieves small angles within ±5 degree range, a mathematical formula for $C_2$ could be easily obtained. As shown in FIG. 9, rolling moment generated from the rear steering is dominated by the linear relationship. That is, the rolling moment generated from rear wheel steering is proportional to the steering angle. It could be written as the following:

$$C_2 = h_{cg} C_s N \mu_{surface} \delta_r$$

where $C_s$ is a constant depending on the steering system. FIG. 9 shows the relationship between the rolling moment generated from rear steering and the measured rear steering angle $\delta_r$.

$P_{MAX}$: the maximum brake pressure can be achieved by the involved brake.

$\delta_{MAX}$: the maximum amount of rear steering angle can be achieved by the rear steering hardware.

The flow chart illustrated in FIG. 7 corresponds to rolling moment distribution calculator 54 of FIG. 3. The moment to prevent rollover $M_R$ is the moment desired for controlling rollover. In block 64, if the desired rolling moment is less than the maximum roll moment generated through rear wheel steering ($\overline{M}_{RWS}$). Step 66 is executed in which the brake flag (BRK_FLAG) is set to zero, the rear wheel steering flag (RWS_FLAG) is set to 1, and the max flag (MAX_FLAG) is set to zero. After step 66, block 68 is executed and will be further described below. To summarize, block 68 determines the brake pressure and rear wheel steering angle for the vehicle.

Referring back to block 64, if the total moment $M_R$ is not less than the moment provided by the rear wheel steering system, then block 70 is executed. In block 70, if the moment to prevent roll $M_R$ is less than the moment provided by the brake system $\overline{M}_{BRK}$. Block 72 is executed in which the brake flag is set to 1. The rear wheel steering flag is set to zero, and the max flag is set to zero. After block 72, block 68 is executed in which the brake pressure at rear wheel steering angles are computed.

Referring back to block 70, if the roll moment $M_R$ is not less than the roll moment provided by the brake system in $\overline{M}_{BRK}$ than block 74 is executed. In block 74, the sum of the moment provided by the rear wheel steering system and the moment provided by the braking system is added together and the sum is compared to the total moment to prevent roll. If the total moment to prevent roll is less than the sum of the moment provided by the rear wheel steering system and the brake system, then block 76 is executed in which the brake flag is set to 1, the rear wheel steering flag is set to 1, and the max flag is set to zero.

Thus, in block 64, 70, and 74, if the respective moment provided by the rear wheel steering system is great enough to prevent roll in block 64 or the moment provided by the braking system is large enough to prevent roll, or the combination of the two is large enough to prevent roll in block 74, this is sufficient. If, however, in block 74, if the total moments being provided at the rear wheel steering system and the brake system are not great enough, then block 78 is executed in which the brake flag is set to one, the rear wheel steering flag is set to one, and the max flag is set to one. The max flag is used to trigger the priority system into maximizing the brake force and rear wheel steering angle to prevent rollover of the vehicle. Based on these priorities set by the flags mentioned in block 66, 72, 76, and 78, the brake pressure and rear wheel steering of the system is calculated.

Figure 8:
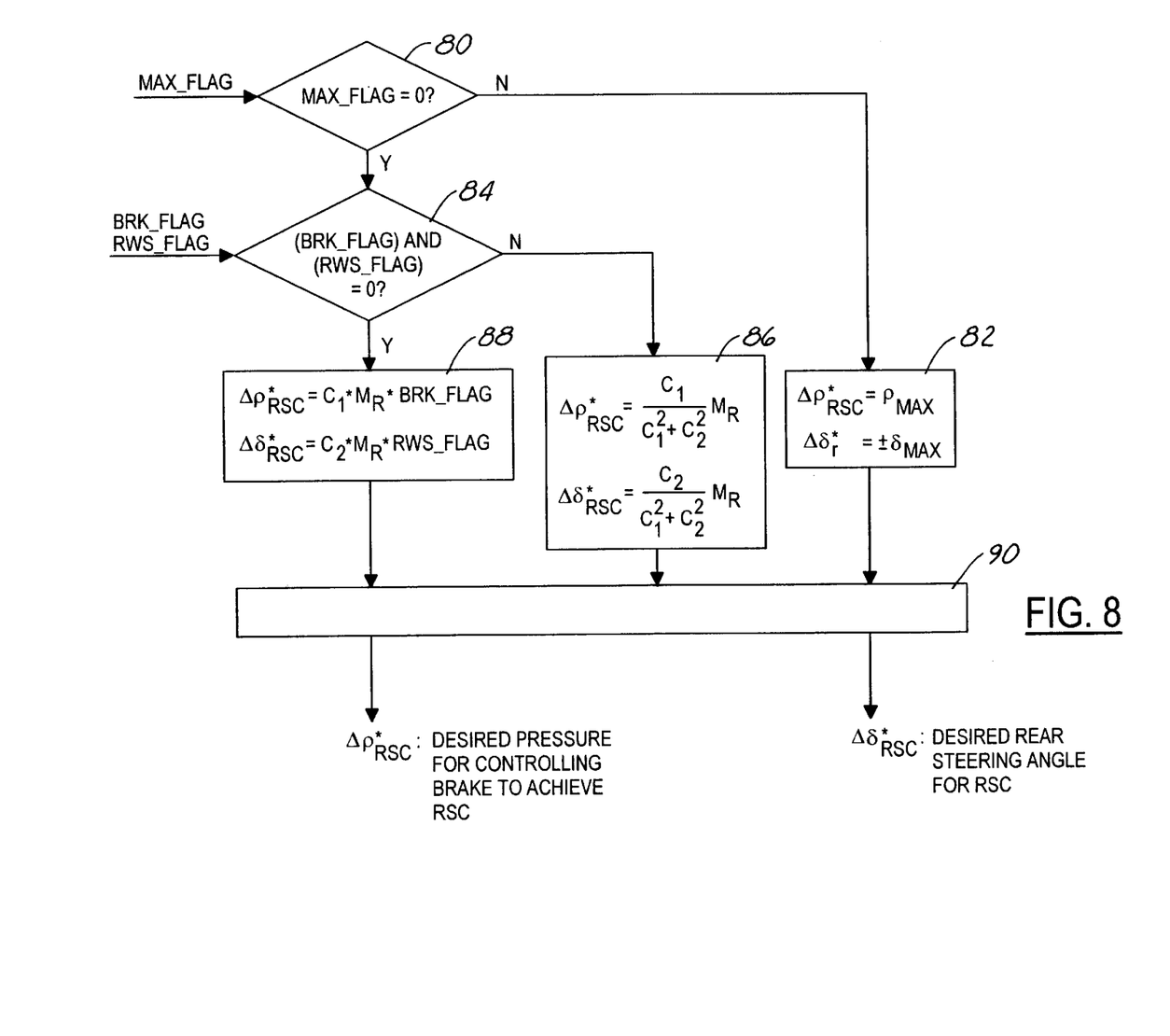
FIG. 8 is a flow chart of brake pressure and rear wheel steering amount determination according to the present invention.

Referring now to FIG. 8, the block 68 illustrated in FIG. 4 is described in further detail. If the max flag is not set to zero in step 80, step 82 is executed in which the maximum pressure and maximum steering wheel angle is provided at the output and used to control the brake pressure control and the rear wheel steering angle of the vehicle. Referring back to block 80, if the max flag is set to zero, then block 84 is executed in which the conditions of both the brake flag and rear wheel steering flag are determined. If the brake flag and the rear wheel steering flag are both not set to zero, then step 86 is executed in which the amount or proportion of roll moment provided by the brake pressure and rear steering angle are determined. The brake pressure is determined by the formula:

$$\Delta p^*_{RSC} = \frac{C}{C_1^2 + C_2^2} M_R$$

The brake rear steering angle is determined by the formula:

$$\Delta \delta^*_{RSC} = \frac{C_2}{C_1^2 + C_2^2} M_R$$

Referring back to step 84, if the brake flag and rear wheel steering flag are both zero, then step 88 is executed in which the amount of braking pressure is provided by the formula:

$$\Delta p_{RSC}^* = C_1 * M_R * BRK\_FLAG$$

The amount of rear wheel steering angle correction is determined by the formula:

$$\Delta \delta_{RSC}^* = C_2 * M_R * RWS\_FLAG$$

In block 90, the brake pressures and the rear steering angles are provided to a distribution block 90 and are thus provided to the particular brake system or steering system to effectuate the desired amount of control. During operation, these systems will continuously update to change the desired amount of control based on the various systems.

In operation, various types of steering control may be performed depending on the vehicle characteristics and the steering system. For example, as described above a rack system may be controlled to provide a desired change in the rear steering angle temporarily to prevent rollover while leaving the front wheels unchanged. Of course, the direction of the front wheels could also be change when the rear direction is changed.

In a system having independently actuable rear wheels, the relative steering angle between the rear wheels may be changed in response to detected roll without changing the position or controlling the position of the front wheels. This may be done by independent control of the rear wheels or simultaneous control of the rear wheels. This may also be done in combination with a desirable amount of brake control.

As described above the longitudinal acceleration sensor and a pitch rate sensor may be incorporated into the above tire force vector determination. These sensors may be used as a verification as well as an integral part of the calculations. For example, the pitch rate or the longitudinal acceleration or both can be used to construct a vehicle pitch angle estimate. This estimate along with its derivative can be used to improve the calculation of the vehicle roll angle.

While particular embodiments of the invention have been shown and described, numerous variations and alternate embodiments will occur to those skilled in the art. Accordingly, it is intended that the invention be limited only in terms of the appended claims.

What is claimed is:

1. A rollover control system for an automotive vehicle having a front steering system and a rear steering system comprising:
   a rear wheel actuator;
   a rear wheel position sensor generating a rear wheel position signal;
   a brake actuator;
   a rollover sensor for producing a rollover signal in response to an impending rollover of the vehicle; and
   a controller coupled to said rear wheel position sensor, said rollover sensor, said rear wheel actuator, and said brake actuator, said controller generating a rear wheel actuator signal and brake actuator signal in response to said rollover signal, said rear wheel actuator signal controlling said rear steering actuator and the brake actuator to prevent the vehicle from rolling over.

2. A stability control system as recited in claim 1 wherein said rollover sensor comprises the combination of a speed sensor; a lateral acceleration sensor; a roll rate sensor; and a yaw rate sensor.

3. A stability control system as recited in claim 2 further comprising a sensor selected from he group of a steering angle sensor, a longitudinal acceleration sensor and a pitch rate sensor.

4. A stability control system as recited in claim 1 wherein said controller changes a tire force vector by changing a direction and rear steering force of said rear actuator in combination with a change in brake force.

5. A stability control system as recited in claim 1 wherein said rear wheel actuator comprises a first right wheel actuator and a left wheel actuator.

6. A stability control system as recited in claim 5 wherein said controller changes a tire force vector by changing a relative direction between said right rear actuator and said left rear actuator.

7. A stability control system as recited in claim 1 wherein said controller comprises rollover control law coupled to a rolling moment distribution calculator.

8. A method of controlling roll stability of an automotive vehicle having a rear steering system comprising the steps of:
   determining a roll angle estimate in response to a rollover sensor; and
   controlling a rear steering actuator and a brake controller to form a predetermined tire force vector in response to the relative roll angle estimate.

9. A method as recited in claim 8 wherein said vehicle comprises a right rear actuator and a left rear actuator and said step of generating comprises generating a tire moment by changing a relative direction between said right rear actuator and said left rear actuator.

10. A method as recited in claim 8 wherein said step of determining a roll angle estimate comprises the steps of:
    determining a yaw rate for the vehicle;
    determining a roll rate for the vehicle;
    determining a lateral acceleration for the vehicle; and
    determining vehicle speed.

11. A method as recited in claim 8 wherein the step of controlling comprises the steps of determining a roll moment distribution from a brake system and from a steering system.

12. A method as recited in claim 8 wherein the automotive vehicle comprises an antilock brake system generating an antilock brake signal and a traction control system generating a traction control signal, and further comprising the steps of generating a brake actuator signal in response to said rollover signal, said antilock brake signal, and said traction control signal, said controller generating a rear wheel actuator signal in response to said rollover signal, said rear wheel actuator signal controlling said rear steering actuator and said brake actuator signal controlling said brake actuator to prevent the vehicle from rolling over.

13. A method as recited in claim 12 wherein a yaw stability control system (YSC) controller is coupled to said brake pressure priority logic, further comprising the step of generating a YSC brake control signal in said YSC controller, generating a brake actuator signal in said brake pressure priority logic in response to said rollover signal, said antilock brake signal, said traction control signal and said YSC brake control signal.

14. A method as recited in claim 8 further comprising rear wheel steering priority logic, generating said rear wheel actuator signal in response to said rollover signal and said YSC rear steering signal.

15. An automotive vehicle comprising:
    an antilock brake controller generating an antilock brake signal;
    a traction controller generating a traction control brake signal;
    a front steering system;
    a rear steering system having a rear wheel actuator and a rear wheel position sensor generating a rear wheel position signal;
    a brake actuator;
    a rollover sensor for producing a rollover signal in response to an impending rollover of the vehicle; and
    a rollover controller coupled to said rear wheel steering sensor, said rollover sensor, said rear wheel actuator, and said brake actuator, said rollover controller having brake pressure priority logic generating a brake actuator signal in response to said rollover signal, said antilock brake signal, and said traction control signal, said controller generating a rear wheel actuator signal in response to said rollover signal, said rear wheel actuator signal controlling said rear steering actuator and said brake actuator signal controlling said brake actuator to prevent the vehicle from rolling over.

16. An automotive vehicle as recited in claim 15 further comprising a yaw stability control (YSC) controller coupled to said rollover controller.

17. An automotive vehicle as recited in claim 16 wherein said YSC controller is coupled to said brake pressure priority logic, said YSC controller generating an YSC brake control signal, said brake pressure priority logic generating a brake actuator signal in response to said rollover signal, said antilock brake signal, said traction control signal and said YSC brake control signal.

18. An automotive vehicle as recited in claim 16 further comprising rear wheel steering priority logic, said YSC controller is coupled to rear wheel steering priority logic, said YSC controller generating a YSC rear steering signal, said rear wheel steering priority logic generating said rear wheel actuator signal in response to said rollover signal and said YSC rear steering signal.

* * * * *